US005268831A

United States Patent [19]

Muntwyler

[11] Patent Number: 5,268,831

[45] Date of Patent: Dec. 7, 1993

[54] METHOD AND APPARATUS FOR INITIATING THE AUTOMATIC REGULATION OF A POWER SUPPLY

[75] Inventor: Peter Muntwyler, Wohlen, Switzerland

[73] Assignee: Plasma-Technik AG, Switzerland

[21] Appl. No.: 718,312

[22] Filed: Jun. 18, 1991

[30] Foreign Application Priority Data

Jun. 18, 1990 [DE] Fed. Rep. of Germany ....... 4019355

[51] Int. Cl.[5] ............................................ H02M 7/155

[52] U.S. Cl. ......................................... 363/87; 363/45

[58] Field of Search ............. 363/87, 85, 88, 128-130, 363/79, 45; 301/230

[56] References Cited

U.S. PATENT DOCUMENTS 3,617,859 11/1971 Dobkin et al. .......................... 323/4
3,651,333 3/1972 Goldberg et al. ................... 307/130
3,683,262 8/1972 Neuffer et al. .......................... 321/5
4,177,389 12/1979 Schott .................................. 307/64
4,224,662 9/1980 Böniger ................................. 363/87
4,594,501 6/1986 Culley et al. ........................ 219/492
4,703,249 10/1987 De La Plaza et al. ............. 323/316
4,999,760 3/1991 Tietema ................................ 363/53

*Primary Examiner*—Steven L. Stephan
*Assistant Examiner*—Adolf Berhane
*Attorney, Agent, or Firm*—Dykema Gossett

[57] ABSTRACT

In order to initiate the automatic regulation of the operating current of a current source in a power supply unit upon closing the operating load circuit connected to the current source, it is proposed that the current source is controlled by presetting the circuit parameters such that the current flowing in the operating load circuit upon closing the operating load circuit reaches a preset or desired value. The current regulation is brought into effect as soon as the difference between the effective value and the preset desired value of the current flowing in the operating load circuit falls below a predetermined threshold value. For this purpose, a regulation circuitry is provided, comprising a voltage regulator, a current regulator and a switching circuitry with a threshold value circuit. The switching circuitry generates a switching signal which effects the change from the initial voltage regulation to the subsequent current regulation as soon as the operating current exceeds a preset value.

7 Claims, 3 Drawing Sheets

METHOD AND APPARATUS FOR INITIATING THE AUTOMATIC REGULATION OF A POWER SUPPLY

BACKGROUND OF THE INVENTION

The present invention refers to a method for initiating the automatic regulation of the operating current of a current source in a power supply unit upon closing the operating load circuit connected to said current source. Further, the invention refers to a power supply unit having a regulating circuitry, particularly for supplying power to a plasma burner unit.

Upon closing the load circuit of a power supply unit in which the operational current is automatically regulated, the possibility exists that current peaks occur due to the dynamic behaviour of the regulation circuitry included in the power supply unit, due to the behaviour of the switching means, serving for closing the load circuit and/or due to the behaviour of the apparatus connected to the load circuit of the power supply unit. These current peaks may lead to problems in the behaviour of the apparatus connected to the power supply means or even may result in damage of electric or electronic components included in this apparatus.

If the regulation circuitry is well designed, it is often possible to keep such current peaks occurring during the initial operating phase within acceptable limits or even to avoid them more or less. However, in many cases, it is very difficult to approach this goal with known measures. For example, one is forced to use a regulation method in which the control signal for the regulation is not continuously affecting the regulation circuitry, but only intermittently.

One example for such a difficult situation is the regulation of electrically controllable diodes, particularly thyristors, by means of a phase shift control mechanism. It is well known in the art that in an electrically controllable diode of the kind mentioned above a current flows beginning with the moment of the ignition of the electrically controllable value up to the zero crossing potential of the alternative current or, in the case of a multiphase rectifier assembly, up to the transition of the current to another electrically controllable diode. There is no possibility to momentarily influence the current through the diode as far as its amount is concerned. Only after the next ignition of the electrically controllable diode is it possible to influence the amount of the current flowing in the load circuit by changing the ignition timing. In the meantime, the amount of current flow is not controllable and can get very large. In other words, due to the time lag of the regulation process severe transients can occur which cannot be avoided by a regulation process of the kind described hereinabove.

The reason for the above mentioned problems may be seen in the fact that usually the current regulation starts just at the beginning of the flow of current in the load circuit with the result that the current regulator must handle quite a large difference between desired or preset current and effective current. Consequently, it should be possible to solve the problem if the aforementioned difference between desired or preset value of the current and effective value of the current is as small as possible in the moment when the current regulation begins to operate, i.e. if the effective value of the current flowing in the load circuit has already reached the desired or preset value at the moment when the operation of the current regulator begins. In other words, the current flowing in the load circuit should be increased to the desired or preset value just at the beginning of the operation, before the current regulator starts to influence the current value. This possibility exists on condition that the current flowing at the moment of closing the load circuit can be effectively limited by other measures up to the moment when the current regulator starts to operate.

SUMMARY OF THE INVENTION

The method according to the invention is based on these concepts; thus, the present invention provides a method for initiating the automatic regulation of the operating current of a current source in a power supply unit upon closing the operating load circuit connected to said current source. Thereby the current source is controlled by presetting the circuit parameters such that the current flowing in the operating load circuit upon closing the operating load circuit reaches a preset or desired value. The current regulation is brought into effect as soon as the difference between the effective value and the preset desired value of the current flowing in the operating load circuit falls below a predetermined threshold value.

According to a simple embodiment which should be sufficient in many cases, prior to closing the operating load circuit, the no-load voltage value of the current source is set by means of the preset or desired current value to such a value which results in a current flow essentially corresponding to the operating current upon closing the operating load circuit whereby the voltage regulation is switched off as soon as the current regulation starts its operation. Thus, in this case, the current regulation starts only then when the difference between the effective value of the current flowing in the load circuit and the desired or preset value is essentially zero.

Under certain circumstances, it may be desirable to bring the current regulation into operation earlier, e.g. when the operating or effective current has reached a value which is only a fraction of the desired or preset value. In this case, another embodiment of the method of the invention can be more useful in which the no-load voltage of the current source is set to an upper threshold value prior to closing the operating load circuit whereby the current regulator initially operates, upon closing the operating load circuit, with an effective current value corresponding to the value of the desired operating current. The result thereof is that the current regulation initially counter-controls the increasing operating current in the load circuit.

The application of the method according to the invention in an electric circuit of a power supply unit comprising a current source which is intermittently regulated, e.g. a current source including electrically controllable rectifier diodes, the on-state and off-state thereof being controlled by a phase shift control means, particularly a current source including thyristors, has the advantage that the current rise period immediately after the moment of closing the load circuit can be safely held under control and, particularly, that no current peaks can occur which exceed the preset or desired value of the operating current during the relatively short initial operating phase.

A particularly interesting application of the method according to the invention may be seen in a power supply unit for industrial gas discharge appliances operating at a high operating current level, for instance for supplying power to a plasma burner or more specifically for the application of one and the same power supply unit for providing power for several different plasma burner units with different power needs. The initiation of such appliances with consecutive continuous gas discharge, i.e. the closing of the load circuit by the ignition of the gas discharge path, difficult since the flawless ignition of the gas discharge and, the maintaining of a stable operating state of the plasma, each have different conditions to which the circuit paraplasma meters of the power supply unit must be adapted. Furthermore, the transition from the ignition phase to the continuous operating phase should be performed with the least possible difficulty; thus, it is necessary to change the circuit parameters of the power supply unit as gently and as rapidly as possible.

The application of the method according to the invention, with the result that current peaks are avoided during an initial phase of operation, particularly during the ignition phase, has several advantages. First, the method of the invention ensures a stable ignition process of the plasma burner or any other gas discharge appliance. Second, an excessive stress and wear of the electrodes of a gas discharge appliance may be avoided. Particularly in connection with small plasma burners an even very short current flow has the result that electrode material is removed with the consequence that the life time of the electrodes is drastically shortened.

According to another aspect of the invention, there is provided a power supply unit having a regulating circuitry, particularly for supplying power to a plasma burner unit, comprising a rectifier assembly including electrically controllable diodes, particularly thyristors, a control circuitry for timely controlling the ignition of the electrically controllable diodes, particularly thyristors, a regulating assembly comprising a voltage regulator and a current regulator, whereby the regulating assembly is operatively connected to the control circuitry.

The regulating assembly operates under no-load conditions as a constant voltage source and under operational conditions as a constant current source.

A similar type of power supply unit comprising a regulation circuitry of this kind is disclosed in German Patent Specification Nr. 2,716,332. Thereby, the current regulator is subordinated to the voltage regulator. In operation, if there is zero current, the power supply unit is regulated to maintain a predetermined voltage, and if a current flows, the power supply unit is regulated to the maximal available voltage. Particular measures to reduce or avoid current peaks which could be created by transient behaviour of the current regulator are not provided.

Another similar type of power supply unit comprising a regulation circuitry of this kind is disclosed in German Published Patent Application (DAS) Nr. 2,017,261. In this application, there is shown a start circuit for a constant voltage regulation with the goal to avoid current peaks in the moment of starting the operation of the power supply unit. According to the disclosure of that patent application, this goal shall be achieved by the measure that the regulation (in this case a voltage regulation) is not effective immediately after the start-up of the power supply unit, but only after a certain time period which is determined by a R-C-member. Contrary to the solution proposed by the present invention, the initiation of the regulation does not take effect dependent upon the preset or desired value of the current, but dependent upon the time constant of an R-C-member.

Thus, the present invention further provides a power supply unit having a regulating circuitry, particularly for supplying power to a plasma burner unit. The power supply unit comprises a rectifier assembly including electrically controllable diodes, particularly thyristors, a control circuitry for timely controlling the ignition of the electrically controllable diodes, particularly thyristors, and a regulating assembly comprising a voltage regulator and a current regulator, said regulating assembly being operatively connected to said control circuitry means. The regulating assembly operates under no-load conditions as a constant voltage source and under operational conditions as a constant current source. Further, there is provided a switching circuitry for optionally operating either said voltage regulator or said current regulator, respectively. Control circuitry means are operatively connected to the switching circuitry, said control circuitry generating a control signal for effecting a switching operation of the switching circuitry dependent upon the difference between the preset or desired value of the operating current in the load circuit and the effective value of the operating current in the load circuit. Finally, means are provided for adjusting the preset or desired value of the no-load voltage of the voltage regulator and the preset or desired value of the current of the current regulator to a value corresponding to the desired value of the operating current of the load connected to the power supply unit.

The exact moment of switching from voltage regulation to current regulation is dependent on the method of operation of the power supply unit. If the power supply unit incorporating the regulating circuitry according to the invention is used for supplying power to an industrial gas discharge appliance, particularly to power a plasma burner, the switching from voltage regulation to current regulation is preferably performed immediately after termination of the ignition phase, i.e. in a moment in which the effective operating current of the plasma burner has reached only a fraction of the normal operating current. This fraction of the normal operating current, which is identified in the following by the term "start current", is a value based on experience, and can be set by a correspondingly adjusted threshold value circuit.

Upon connecting a load to a load circuit of a power supply unit, usually the full operating current begins to flow, i.e. the amount of current which is required for the operation of the load. Thereby, usually an initial current peak occurs. Especially if the operating currents are considerably high, the current peak can initiate problems of various kinds, e.g. it can generate high mechanical forces in the current conductors or it can induce high electric or electromagnetic fields in adjacent electric appliances. Furthermore, experience has shown that the ignition of a gas discharge operation may be critical if the current flow initiated by the ignition process exceeds a certain amount. Consequently, it has proven advantageous to limit the current to a predetermined limited value during an initial phase after closing the load circuit and, thereafter, to increase the value of current flow slowly and continuously up to the desired operating value in order to avoid the aforementioned disadvantages. Additionally, in view of the operation of plasma burners or other gas discharge appliances with different power requirements, this measure has the advantage that, initially, the same operating current can be preset or predetermined which is limited and lower than the normal operating current, with the result that different plasma burners with differing power outputs can be operated with the same constant basic setting of the power supply unit.

BRIEF DESCRIPTION OF THE DRAWINGS

In the following, the invention will be further described, with reference to the accompanying drawings, in which.

DETAILED DESCRIPTION OF A PREFERRED EMBODIMENT

Figure 1:
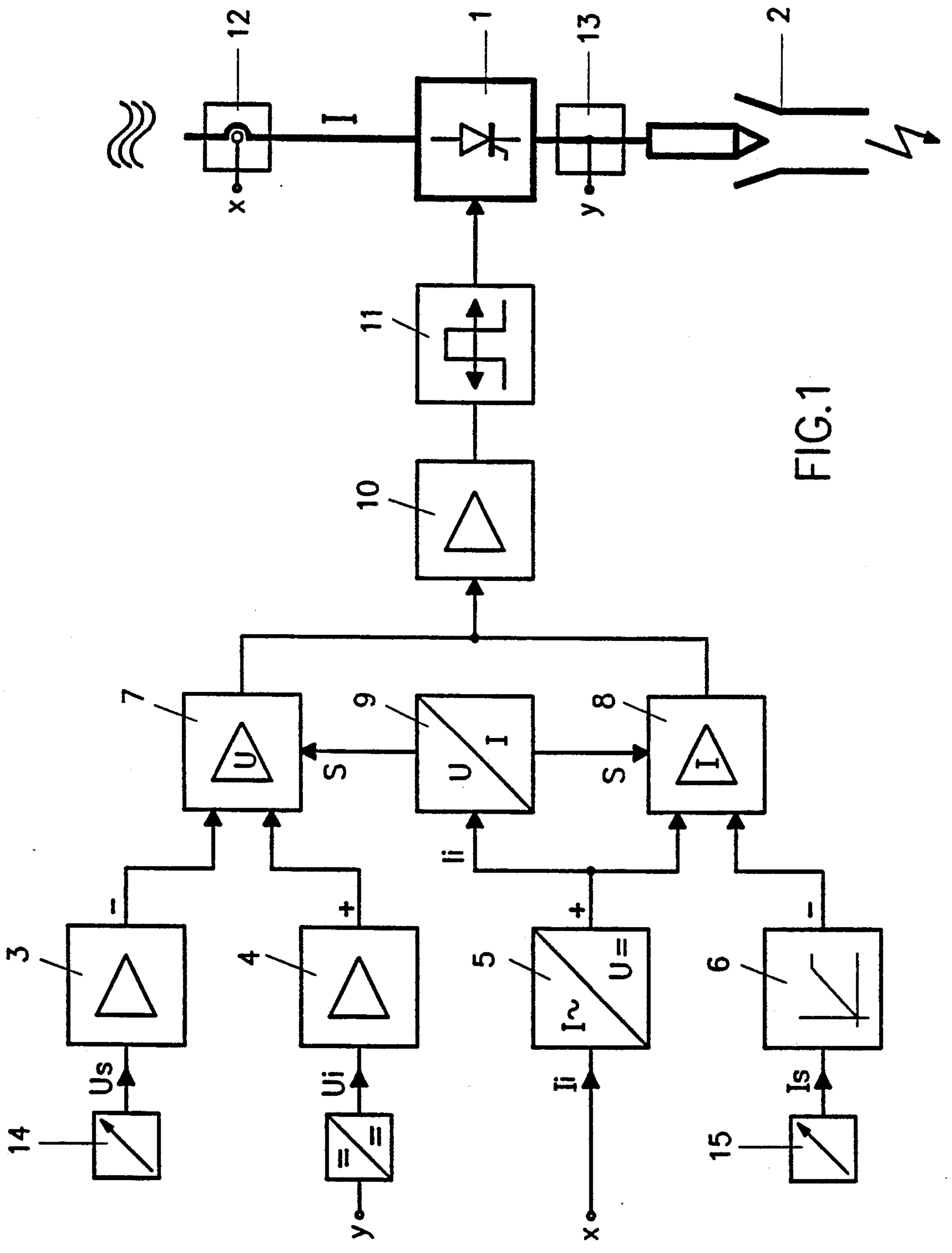
FIG. 1 shows a power supply unit for a gas discharge appliance, especially for a plasma burner, incorporating the regulation circuitry according to the invention.

According to FIG. 1, the load circuit of the power supply unit comprises a rectifier assembly 1 connected to a three-phase mains supply and a plasma burner unit 2 connected to the rectifier assembly 1 and powered by said rectifier assembly 1. The rectifier assembly 1 comprises controlled rectifier members, e.g. controlled diodes, which are for example arranged in a three-phase bridge circuit. Preferably, the controlled rectifier members are thyristors controlled by a phase shift control circuitry in order to set their on-time in the direction of current flow and, thereby, to determine the power delivered to the plasma burner 2. Such circuit details are well known to any person skilled in the art and need not to be explained further.

As can be further seen from FIG. 1, the load circuit of the power supply unit comprises only schematically shown means 12 for measuring the actual values of the current flowing in said load circuit, said means 12 having an output x delivering a signal equivalent to the actual current flow, as well as means 13 for measuring the actual values of the voltage applied to the plasma burner unit 2, said means 13 having an output y delivering a signal equivalent to the actual voltage applied to the plasma burner unit 2. The signals appearing at the output terminals x and y are required for the operation of the regulating circuitry which will be discussed and further explained hereinbelow. As can be seen from FIG. 1, the current in the load circuit is measured in the AC branch of the load circuit, while the voltage is measured across the terminals of the plasma burner 2.

The regulating unit comprises a circuitry means 3 for generating an output signal corresponding to the desired or preset value of the voltage $U_s$ in the load circuit, a circuitry means 4 for generating an output signal corresponding to the effective value of the voltage $U_i$ in the load circuit, a circuitry means 5 for generating an output signal corresponding to the effective value of the current $I_i$ in the load circuit and a circuitry means 6 for generating an output signal corresponding to the desired or preset value of the current $I_s$ in the load circuit. Further, there are provided a voltage regulator circuitry 7, a current regulator circuitry 8 as well as a switching circuitry 9 for switching the regulating unit between voltage regulation mode and current regulation mode. The resulting regulation signal is fed via an amplifier circuitry 10 to a control circuitry 11 which serves to timely control the ignition of the thyristors of the rectifier assembly 1.

The desired values of the voltage $U_s$ and of the current $I_s$ in the load circuit are preset signals in the form of voltages having, for example, positive amplitude. The values of these voltages depend from the kind of the load, in the present example from the kind and size of the plasma burner 2. If, as usual, plasma burners 2 with different power requirements are to be used with the power supply unit, the amplitude of the voltages representing $U_s$ and $I_s$ can be set to different values.

The circuitry means 3 and 6 essentially comprise an inverter circuit with the result that the output thereof is a signal with negative amplitude. Furthermore, the circuitry means 6 contains an integrator which provides for a slow change of the operating current if the desired or preset current value $I_s$ is suddenly changed. The circuitry means 4 essentially contains an impedance converter and the circuitry means 5 essentially contains a rectifier circuit. Both circuitry means 4 and 5 deliver an output signal in the form of a voltage having positive amplitude. Thus, the comparison of the negative preset or desired signals for voltage and current, respectively, with the positive effective signals for voltage and current, respectively, may be effected by a simple signal addition in the voltage regulator 7 and the current regulator 8, respectively.

The switching circuitry 9 generates, in response to the preset or desired value of the current $I_s$ in the load circuit, a switching signal S which causes due to a polarity change a change from voltage regulation to current regulation as soon as the operating current exceeds a certain value. For this purpose, the switching circuitry comprises a threshold value circuitry.

Figure 2:
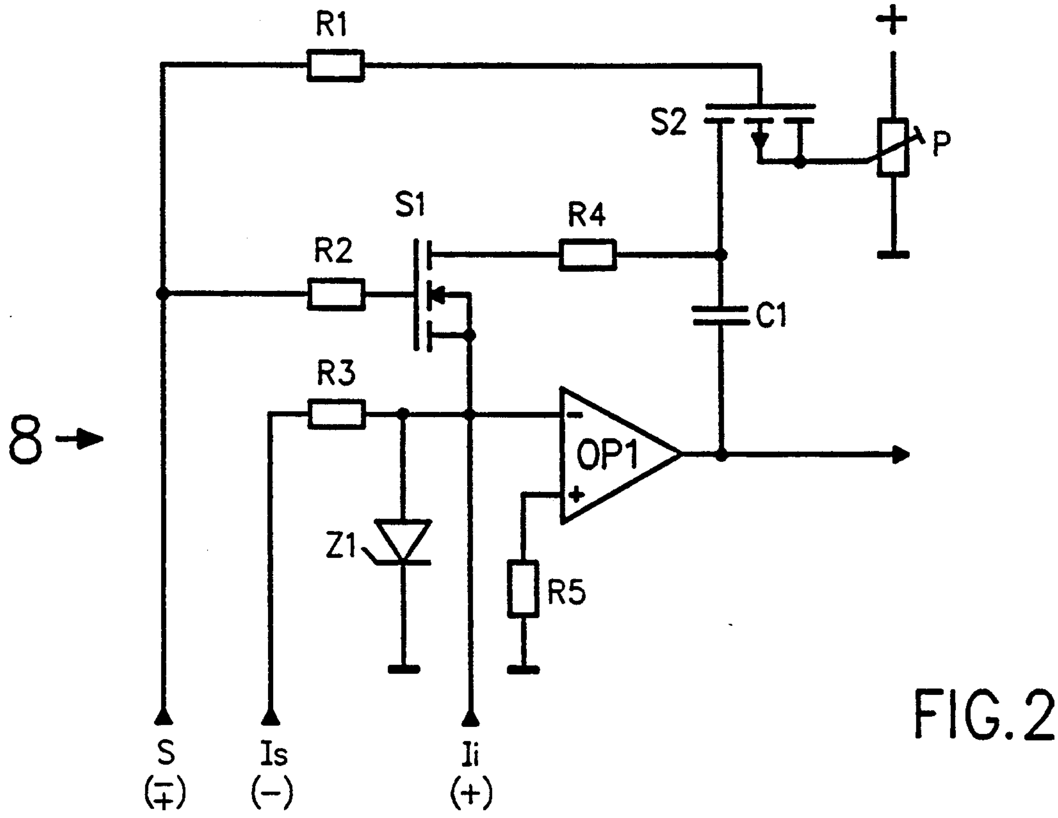
FIG. 2 shows the schematic diagram of the current regulation circuitry.

The design of the current regulator 8 is shown in more detail in FIG. 2. The basic element of the current regulator is an operational amplifier $OP_1$ operating as an PI-regulator. In its feedback path, an integrator member formed by the capacitor $C_1$ and the resistor $R_4$ is provided. The negative signal $I_s$ representing the preset or desired value of the current in the load circuit and the positive signal $I_i$ representing the effective value of the current in the load circuit are tied together at the inverting input of the operational amplifier $OP_1$. The non-inverting input thereof is connected to ground potential via a resistor $R_5$. A zener diode $Z_1$ with a series resistor $R_3$ limits the amplitude of the preset or desired signal $I_s$. A first electronic switch member $S_1$ serves to activate or deactivate the feedback path. The capacitor $C_1$ may be connected to a voltage source via a second electronic switch member $S_2$ whereby the amplitude of the voltage fed to the capacitor $C_1$ is adjustable by a potentiometer P. Preferably, the aforementioned electronic switches $S_1$ and $S_2$ are self-locking field effect transistors whereby a n-channel type field effect transistor is used for the electronic switch member $S_1$ and a p-channel type field effect transistor is used for the electronic switch member $S_2$. The two electronic switch members $S_1$ and $S_2$ are commonly controlled by the switching signal S generated by the switching circuitry 9 whereby said switching signal S is connected to the first switching member $S_1$ via a resistor $R_2$ and to the second switching member $S_2$ via a resistor $R_1$.

As long as the switching signal S is negative, the first switching member $S_1$ is in its open state and the second switching member $S_2$ is in its closed state. Thereby, the feedback path is interrupted and the signal appearing at the output of the operational amplifier $OP_1$ does not have any regulation function. Simultaneously, the capacitor $C_1$ is connected to a positive voltage and held on a preset positive potential. As soon as the switching signal S changes from a negative to a positive amplitude, the first switching member $S_1$ closes and the second switching member $S_2$ opens. Thereby, the operational amplifier $OP_1$ starts to operate as a PI-regulator with a preset condition determined by the charge condition of the capacitor $C_1$.

As soon as the current regulator circuitry 8 has been switched on as hereinbefore described, the voltage regulator circuitry 7 is switched off. Preferably, the same switching signal S is used to simultaneously switch-on the current regulator 8 and to switch-off the voltage regulator circuitry 7. The basic circuit design of the voltage regulator 7 and the design of the switch-on and switch-off circuit are well known to any person skilled in the art and it is not necessary to fully explain these design details herein.

Figure 3:
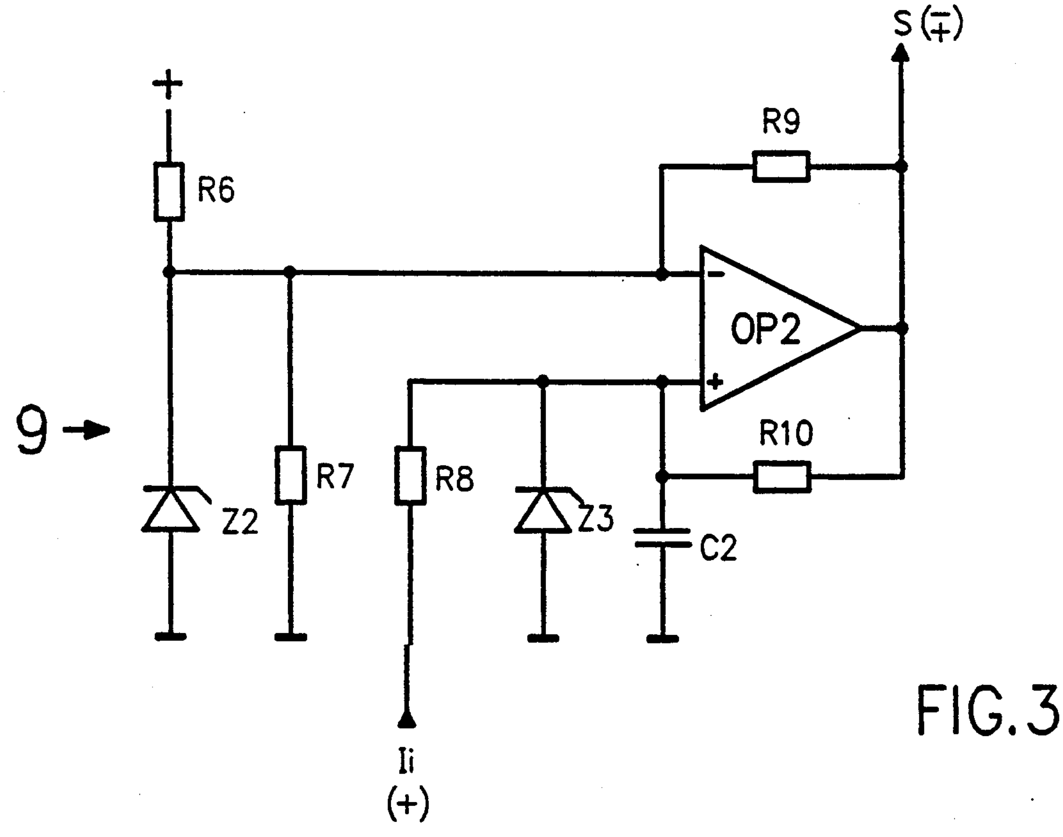
FIG. 3 shows the schematic diagram of a current-responsive switching circuitry for switching the power supply unit from voltage regulation to current regulation.

The switching circuitry 9 is shown in detail in FIG. 3. The basic element of this circuit design is an operational amplifier $OP_2$ operating as a threshold value switching member whereby the switching signal S is generated at the output of the operational amplifier $OP_2$. The signal $I_i$ corresponding to the effective value of the current in the load circuit is fed to the non-inverting input of the operational amplifier $OP_2$ via a resistor $R_8$. The inverting input of the operational amplifier $OP_2$ is connected to a voltage divider formed by the two resistors $R_6$ and $R_7$ which delivers a positive reference voltage stabilized by a zener diode $Z_2$. A further zener diode $Z_3$ serves to limit the amplitude of the input signal $I_i$ fed to the non-inverting input of the operational amplifier $OP_2$. A capacitor $C_2$ is connected in parallel with the zener diode $Z_3$.

The output signal of the operational amplifier $OP_2$ is fed back to the inverting input thereof via resistor $R_9$ and to the non-inverting input thereof via resistor $R_{10}$. If the current-dependent signal $I_i$ is low in amplitude, the resulting output signal of the operational amplifier $OP_2$, representing the switching signal S, is negative. The switching signal S changes its polarity as soon as the current I in the load circuit and thereby the signal $I_i$ representing the effective load current exceeds the threshold value determined by the reference signal; even if the current in the load circuit increases, the switching signal S remains positive.

The regulation circuitry hereinbefore described in connection with FIGS. 1 to 3 is as follows:

As soon as the power supply unit is switched on, a preparation phase is initiated. During this preparation phase, the rectifier assembly 1 is connected to the mains voltage. Furthermore, the regulation circuitry is fed with the preset values $U_s$ and $I_s$ for the voltage and the current. Because the switching signal S is of negative amplitude due to the lack of the operating current I in the load circuit of the power supply unit, the voltage regulator 7 is operative and the current regulator 8 is switched off, i.e. does not work. By the operation of the voltage regulator 7, the idling voltage at the plasma burner 2 is limited to a certain value. Simultaneously, the switching unit $S_2$ being still closed, the capacitor $C_1$ of the current regulator 8 is charged to a predetermined voltage level. Thereby, the current regulator is forced into a predetermined operating condition because the voltage over the capacitor $C_1$ represents a preset desired value of the operating current in the load circuit; thus, the resulting operating current in the load circuit corresponds to a desired initial operating current of the plasma burner 2. Now, the preparation phase has come to an end.

Thereafter, the ignition of the plasma burner 2 takes place by means of separate, not shown ignition means such that the operating load circuit is closed. With other words, an operating current I starts to flow which increases in value very rapidly. As soon as the value of the operating current I exceeds the aforementioned threshold value, the switching signal S changes its polarity with the result that the voltage regulator 7 is switched off and the current regulator 8 is switched on. The current regulator starts its operation with the momentarily present effective value of current which for instance corresponds to the preset or desired value $I_s$ of the operating current. In fact, the current regulator initially operates according to a preset or desired value of the operation current I in the load circuit which has not yet been achieved in this moment. Thereby, the rectifier assembly 1 is momentarily controlled such that the current flowing through the operation circuit is reduced until the real effective value of the current flowing in the load circuit comes into effect in the regulation circuitry. Due to this time lag in the regulation, an overshoot in the operation of the current regulator is practically excluded.

Figure 5:
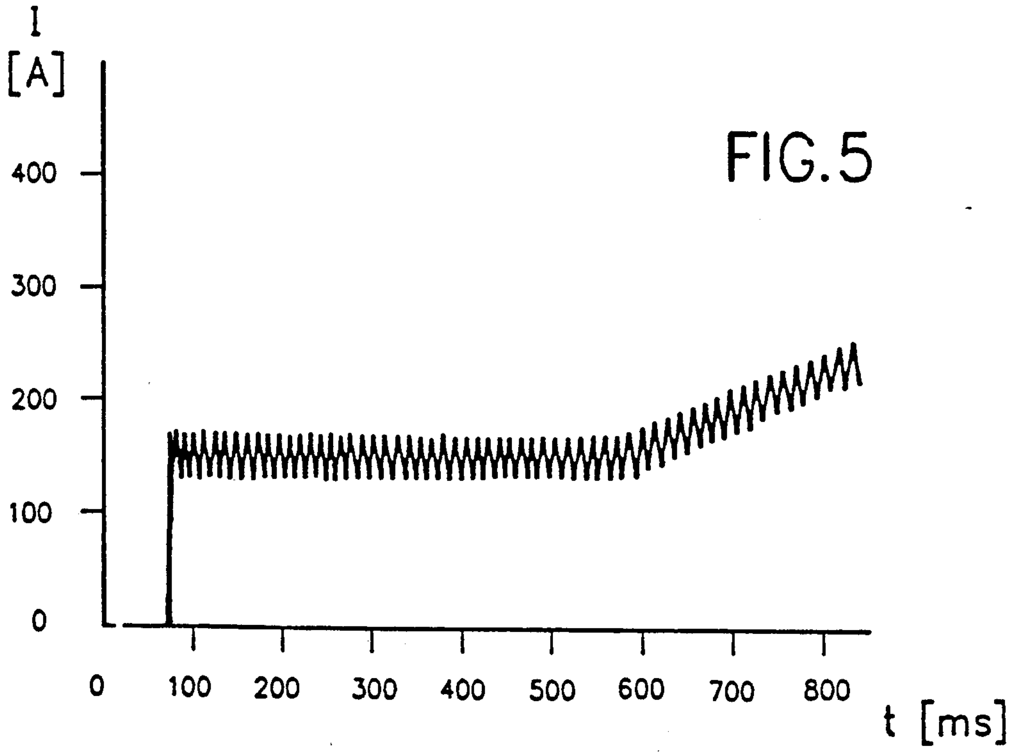
FIG. 5 shows a time versus current diagram demonstrating the development of the current in the load circuit when a plasma burner is connected to a power supply unit according to FIG. 1 of this invention.

This behaviour of the power supply unit can be clearly demonstrated by means of the diagram shown in FIG. 5 which shows the initial current after starting the operation of the plasma burner 2 versus the time. The operating current I increases thereby from zero to a preset value of, lets say, 150 A and is essentially kept constant by means of the current regulator 8. It takes just a few tenth of seconds and the current can be increased to a value (e.g. 1000 A) required for the operation of the plasma burner 2 (or it can be decreased, as necessary), whereby the current I changes just slowly due to the time determining member in the circuitry 6, as can be clearly seen in FIG. 5.

Figure 4:
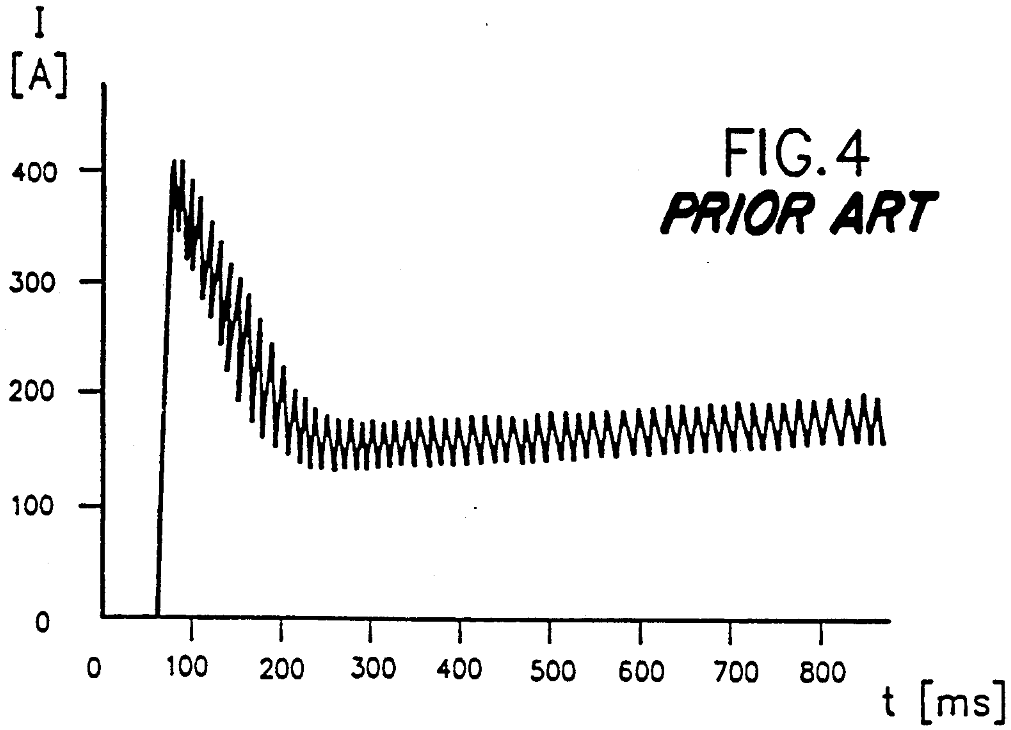
FIG. 4 PRIOR ART
FIG. 4 shows a time versus current diagram demonstrating the development of the current in the load circuit when a plasma burner is connected to a conventional power supply unit.

In contrary, FIG. 4 shows the current flow under identical conditions, but without the regulation circuitry operating in the manner as hereinbefore explained. It can be clearly seen that current peaks in the order of 400 A are to be expected during the initial phase of operation.

What is claimed is:

1. A method for initiating the automatic regulation of the operating current of a current source in a power supply unit upon closing the operating load circuit connected to said current source, whereby the current source is controlled by presetting the circuit parameters such that the current flowing in the operating load circuit upon closing the operating load circuit reaches a preset or desired value, and whereby the current regulation is brought into effect as soon as the difference between the effective value and the preset desired value of the current flowing in the operating load circuit falls below a predetermined threshold value.

2. A method according to claim 1 in which, prior to closing the operating load circuit, the no-load voltage value of the current source is set by means of the preset or desired current value to such a value which results in a current flow which essentially corresponds to the operating current upon closing the operating load circuit whereby the voltage regulation is switched off as soon as the current regulation starts its operation.

3. A method according to claim 1 in which the no-load voltage of the current source is set to an upper threshold value prior to closing the operating load circuit whereby the current regulator initially operates, upon closing the operating load circuit, with an effective current value corresponding to the value of the desired operating current.

4. A power supply unit having a regulating circuitry, particularly for supplying power to a plasma burner unit, comprising:

a rectifier assembly including electrically controllable diodes, particularly thyristors;

a control circuitry means for timely controlling the ignition of said electrically controllable diodes, particularly thyristors;

a regulating assembly comprising a voltage regulator means and a current regulator means, said regulating assembly being operatively connected to said control circuitry means;

said regulating assembly operating under no-load conditions as a constant voltage source and under operational conditions as a constant current source;

a switching circuitry means for optionally operating either said voltage regulator means or said current regulator means, respectively;

control circuitry means operatively connected to said switching circuitry means, said control circuitry means generating a control signal for effecting a switching operation of said switching circuitry means in dependence of the difference between preset or desired value of the operating current in the load circuit and the effective value of the operating current in the load circuit; and means for adjusting the preset or desired value of the no-load voltage of said voltage regulator means and the preset or desired value of the current of said current regulator means to a value corresponding to the desired value of the operating current of the load connected to said power supply unit.

5. A power supply unit according to claim 4 in which said current regulator means comprises:

an operational amplifier operating as a PI-regulator, having an integrator member comprising a resistor and a capacitor arranged in its feedback path;

a first electronic switching means adapted to open and close said feedback path of said operational amplifier;

a second electronic switching means connected to a voltage source with adjustable voltage in order to optionally connect and disconnect said capacitor of said integrator member to said voltage source; and a means for generating a switching signal operatively connected to said first and second switching means such that, upon feeding the same switching signal to said first and second switching means, said first switching means is in its open state and said second switching means is in its closed state or vice versa.

6. A power supply unit according to claim 5 in which said first and said second switching means comprise self-locking field effect transistors, one of said field effect transistor being a n-channel type and the other of said field effect transistors being a p-channel type, whereby both field effect transistors are fed with a switching signal of changing polarity.

7. A power supply unit according to claims 5 in which said means for generating said switching signal generates an output signal in response to a threshold value of the operational current in the load circuit, said output signal changing its polarity as soon as said threshold value is exceeded.

* * * * *